United States Patent
Gies et al.

(10) Patent No.: US 7,312,800 B1
(45) Date of Patent: Dec. 25, 2007

(54) COLOR CORRECTION OF DIGITAL VIDEO IMAGES USING A PROGRAMMABLE GRAPHICS PROCESSING UNIT

(75) Inventors: Sean Matthew Gies, San Jose, CA (US); James Batson, Saratoga, CA (US); Tim Cherna, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 11/113,817

(22) Filed: Apr. 25, 2005

(51) Int. Cl.
- *G09G 5/02* (2006.01)
- *G09G 5/36* (2006.01)
- *G03F 3/08* (2006.01)
- *G06F 15/00* (2006.01)
- *G06F 13/00* (2006.01)
- *H04N 1/46* (2006.01)
- *H04N 7/01* (2006.01)
- *G06F 1/00* (2006.01)
- *H04N 5/44* (2006.01)
- *H04N 5/202* (2006.01)
- *H04N 7/12* (2006.01)

(52) U.S. Cl. ............ 345/591; 345/604; 345/536; 345/547; 345/549; 348/441; 348/557; 348/558; 358/523; 358/524; 358/518; 382/162; 382/167

(58) Field of Classification Search ........ 345/589–591, 345/600–604, 501, 530–531, 536–541, 545, 345/549, 539, 553, 547, 555; 348/222.1, 348/223.1, 231.3, 474, 441, 557, 558; 358/452, 358/448, 523–524, 515–519; 382/162–167
See application file for complete search history.

(56) References Cited

U.S. PATENT DOCUMENTS

| | | | |
|---|---|---|---|
| 7,038,690 B2 * | 5/2006 | Wilt et al. .................. 345/537 |
| 2001/0008428 A1 * | 7/2001 | Oh ............................ 348/649 |
| 2003/0001861 A1 * | 1/2003 | Watson et al. .............. 345/609 |
| 2004/0190617 A1 * | 9/2004 | Shen et al. ............ 375/240.16 |
| 2005/0141778 A1 * | 6/2005 | Nakajima et al. ............ 382/254 |
| 2006/0209080 A1 * | 9/2006 | Ohlsson et al. ............. 345/543 |

* cited by examiner

*Primary Examiner*—Wesner Sajous
(74) *Attorney, Agent, or Firm*—Wong, Cabello, Lutsch Rutherford & Brucculeri LLP

(57) ABSTRACT

A system which utilizes the processing capabilities of the graphics processing unit (GPU) in the graphics controller. Each frame of each video stream or track is decoded into a buffer and a color profile indicating parameters of the color space of the video source is associated with the buffer. The compositor uses the color profile to convert each buffer to a defined working color space from the source color space. This conversion and rendering of the buffer is performed using the fragment processing capabilities of the GPU. The compositor then instructs the GPU to convert the buffer to the final color space of the display device and the frame is rendered to the frame buffer for final display. Each of these operations is done in real time for each frame of the video.

15 Claims, 5 Drawing Sheets

QuickTime Operations

Compositor Operations

COLOR CORRECTION OF DIGITAL VIDEO IMAGES USING A PROGRAMMABLE GRAPHICS PROCESSING UNIT

RELATED APPLICATIONS

The subject matter of the invention is generally related to the following jointly owned and co-pending patent application: "Display-Wide Visual Effects for a Windowing System Using a Programmable Graphics Processing Unit" by Ralph Brunner and John Harper, Ser. No. 10/877,358, filed Jun. 25, 2004, which is incorporated herein by reference in its entirety.

BACKGROUND

The invention relates generally to computer display technology and, more particularly, to the application of visual effects using a programmable graphics processing unit during frame-buffer composition in a computer system.

Presentation of video on digital devices is becoming more common with the increases in processing power, storage capability and telecommunications speed. Programs such as QuickTime by Apple Computer, Inc., allow the display of various video formats on a computer. In operation, QuickTime must decode each frame of the video from its encoded format and then provide the decoded image to a compositor in the operating system for display.

Because of the limited power of the CPU, it has not been possible to provide real time color compensation for a single video stream, much less multiple video streams. As a result, when real time video is displayed using a computer, the colors are generally incorrect because no compensation can be performed. Instead, generic color spaces and conversions are used. Thus a displayed image's appearance will change for each video source and video output. As this cannot be done for even one video stream, it becomes worse when multiple video streams are involved.

Thus, it would be beneficial to provide a mechanism by which real time video can be color compensated, both for video source and for the ultimate display device. Further, it would be beneficial to do this for multiple, simultaneous video streams.

SUMMARY

A system according to the present invention utilizes the processing capabilities of the graphics processing unit (GPU) in the graphics controller. Each frame of each video stream or track is decoded into a buffer and a color profile indicating parameters of the color space of the video source is associated with the buffer. After all of the streams have been decoded, the compositor uses the color profile to convert each buffer to a defined working color space from the source color space. This conversion and rendering of the buffer is performed using the fragment processing capabilities of the GPU. After any other desired operations, the compositor instructs the GPU to convert the buffer to the final color space of the display device and the frame is rendered to the frame buffer for final display. Each of these operations is done in real time for each frame of the video. Because each stream or frame is properly color converted, the final displayed image will be the uniformly colored for each video source and each display.

DETAILED DESCRIPTION

Methods and devices to provide real time video color compensation using fragment programs executing on a programmable graphics processing unit are described. The compensation can be done for multiple video streams and compensates for the video source, conversion errors and display device. The following embodiments of the invention, described in terms of the Mac OS X window server and compositing application and the QuickTime video application, are illustrative only and are not to be considered limiting in any respect. (The Mac OS X operating system and QuickTime are developed, distributed and supported by Apple Computer, Inc. of Cupertino, Calif.)

Figure 1:
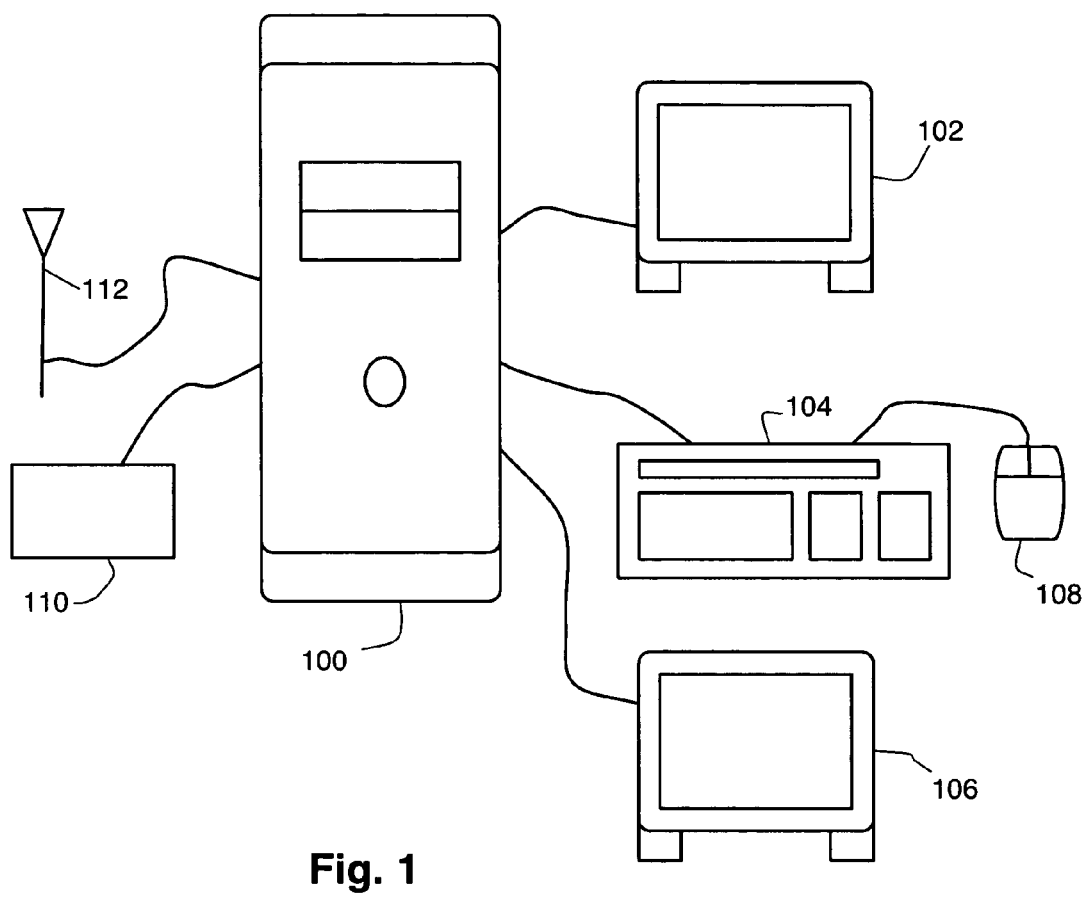
FIG. 1 shows an illustration of a computer system with various video sources and displays.

Referring now to FIG. 1, a computer system is shown. A computer 100, such as a PowerMac G5 from Apple Computer, Inc., has connected a monitor or graphics display 102 and a keyboard 104. A mouse or pointing device 108 is connected to the keyboard 104. A video display 106 is also connected for video display purposes. The display 102 can also be used for video display, but in that case it is usually done in a window in the graphic display.

A video camera 110 is shown connected to the computer 100 to provide a first video source. A cable television device 112 is shown as a second video source for the computer 100.

It is understood that this is an exemplary computer system and numerous other configurations and devices can be used.

Figure 2:
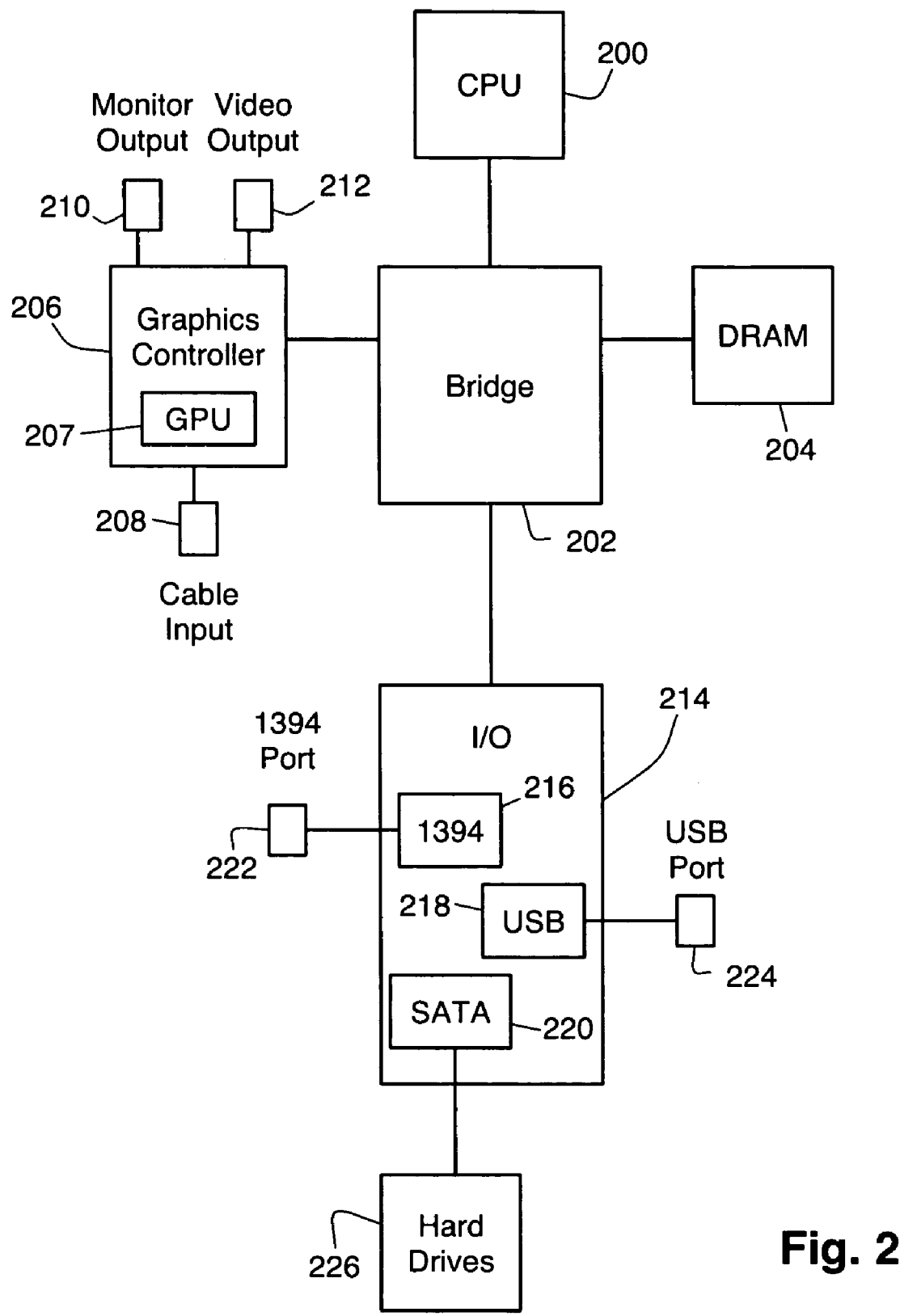
FIG. 2 shows an exemplary block diagram of the computer of FIG. 1.

Referring to FIG. 2, an exemplary block diagram of the computer 100 is shown. A CPU 200 is connected to a bridge 202. DRAM 204 is connected to the bridge 202 to form the working memory for the CPU 200. A graphics controller 206, which preferably includes a graphics processing unit (GPU) 207, is connected to the bridge 202. The graphics controller 206 is shown including a cable input 208, for connection to the cable device 112; a monitor output 210, for connection to the graphics display 102; and a video output 212, for connection to the video display 106.

An I/O chip 214 is connected to the bridge 202 and includes a 1394 or FireWire™ block 216, a USB (Universal Serial Bus) block 218 and a SATA (Serial ATA) block 220. A 1394 port 222 is connected to the 1394 block 216 to receive devices such as the video camera 110. A USB port 224 is connected to the USB block 218 to receive devices such as the keyboard 104 or various other USB devices such as hard drives or video converters. Hard drives 226 are connected to the SATA bock 220 to provide bulk storage for the computer 100.

It is understood that this is an exemplary block diagram and numerous other arrangements and components could be used.

Figure 3:
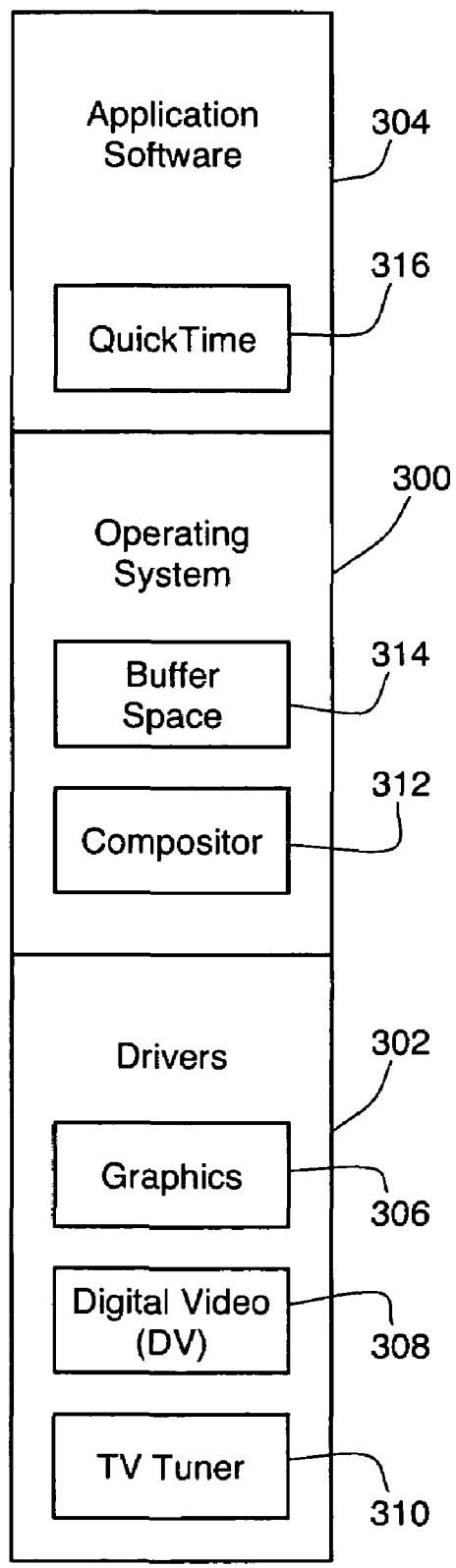
FIG. 3 shows an exemplary software environment of the computer of FIG. 1.

Referring them to FIG. 3, a drawing of exemplary software present on the computer 100 is shown. An operating system, such as Mac OS X by Apple Computer, Inc., forms the core piece of software. Various device drivers 302 sit below the operating system 300 and provide interface to the various physical devices. Application software 304 runs on the operating system 300.

Exemplary drivers are a graphics driver 306 used with the graphics controller 206, a digital video (DV) driver 308 used with the video camera 110 to decode digital video, and a TV tuner driver 310 to work with the graphics controller 206 to control the tuner functions.

Particularly relevant to the present invention are two modules in the operating system 300, specifically the compositor 312 and buffer space 314. The compositor 312 has the responsibility of receiving the content from each application for that application's window and combining the content into the final displayed image. The buffer space 314 is used by the applications 304 and the compositor 312 to provide the content and develop the final image.

The exemplary application is QuickTime 316, a video player program in its simplest form. QuickTime can play video from numerous sources, including the cable, video camera and stored video files. The video may include multiple video tracks, not just a single video track.

Figure 4:
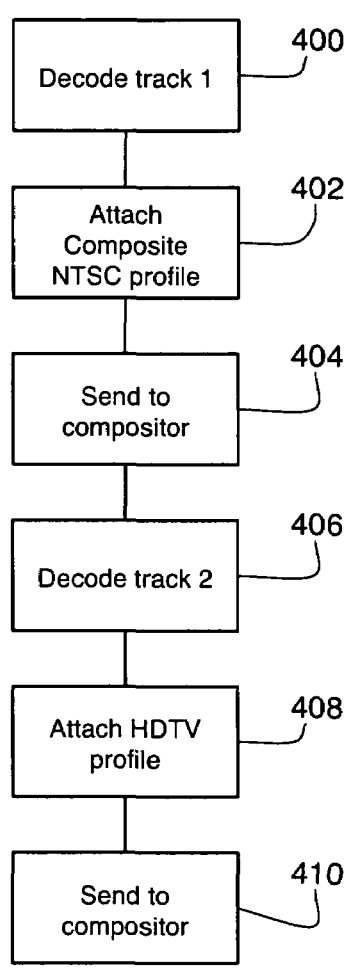
FIG. 4 shows a flowchart of operation of video software according to the present invention.

Having set this background, and referring then to FIG. 4, the operations of the QuickTime application 316 are illustrated. In step 400 the QuickTime application 316 decodes track 1. In the illustrated embodiment two tracks are used to develop the actual video image being displayed. It is understood that often a single track or further tracks can be utilized, but the two track example is considered most informative. Further, the tracks can come from real time sources or from a stored or streaming video file. After the QuickTime application 316 decodes track 1 in step 400, it attaches a Composite NTSC color profile in step 402. As known to one skilled in the art, each video source and display operates in a particular color space. A color space is a technique and method to describe the characteristics of color values for the relevant device. There are different color spaces for different devices, some of which are linear, some are non-linear. There are numerous other characteristics of particular color spaces. In reference to operation according to the present invention, generally each video source has a color space in which it is operating. In the instance illustrated in track 1, a normal digital camera is utilized to encode and record track 1, thus indicating that it was recorded with the Composite NTSC color profile. Color profiles generally include information such as the device color space, a desired working color space and parameters to convert between the color spaces. See the International Color Consortium specification ICC.1:2004-10 (Profile Version 4.2.0.0), which is hereby incorporated by reference, for more information on color profiles. After the profile is attached to the decoded track, the buffer and attached profile are sent to the compositor 312 in step 404. The QuickTime application 316 then decodes track 2 in step 406. In the illustrated embodiment track 2 is an HDTV image which was recorded by an HDTV camera. Therefore in step 408 the HDTV profile is attached to the decoded information and the combination is provided to the compositor in step 410. It is understood that the color spaces for NTSC, PAL and HDTV all use Y'CbCr encoding but because there are slight differences in the actual encodings and NTSC/PAL and HDTV thus have slightly different parameters or equations for conversions, this description will generally specify the source color space and not the encoding scheme for clarity. It is also understood that these steps are performed for each frame in the video. It is noted that because these steps are performed for each frame, the color spaces can also be changed with each frame, if desired.

Figure 5:
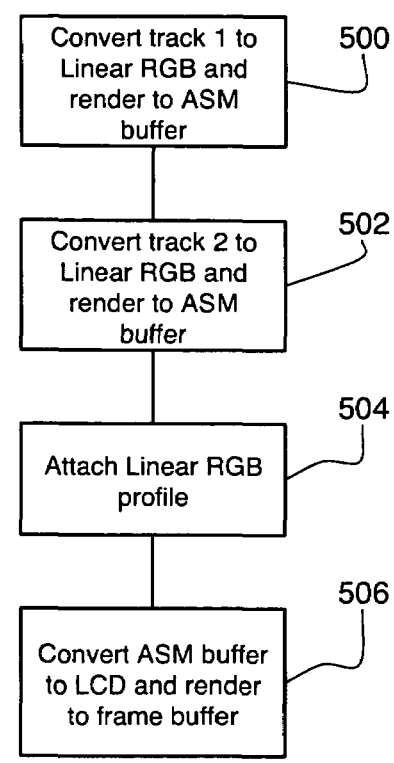
FIG. 5 shows a flowchart of operation of a compositor according to the present invention.

Referring then to FIG. 5, the operations of the compositor 312 are illustrated. The compositor 312 converts track 1, which is received from step 404, in step 500. The exemplary conversion for track 1 is from the Composite NTSC color space to an arbitrary or working color space, in this case indicated as being the Linear RGB color space. In the preferred embodiments, two conversions are actually performed, one from Composite NTSC, the source color space in the example, to the XYZ color space, an intermediate color space usually used for such conversions, and then from the XYZ color space to the Linear RGB color space, the working color space in the example embodiment. Only the Composite NTSC profile is provided to the compositor as it has the information needed to perform the XYZ to Linear RGB conversion and knows the results are to be provided in the Linear RGB color space. During this conversion the frame from decoded track 1 is rendered to a ASM or assembly buffer in the buffer space 314. In step 502 the compositor 312 converts track 2 from the HDTV color space to the Linear RGB color space and renders it into the ASM buffer. In step 504 the Linear RGB color space profile is attached to the ASM buffer and then in step 506 the compositor converts the ASM buffer to the proper LCD color space for display by the graphics display 102 and then this is rendered to the frame buffer for ultimate display on the LCD graphics display in the illustrated embodiment. Again in the preferred embodiment this is done by converting through the XYZ color space. Also, only the Linear RGB color profile is needed to be attached because the compositor knows the conversion from the intermediate XYZ color space to the display color space and knows to use that conversion because the destination is the frame buffer. It is, of course, understood that should a different display device be used, in step 506 a different color profile or conversion profile would be used, to convert from the working or Linear RGB color space to the display device color space. Similarly, a different display source would utilize different source color profiles. As above, these operations are performed for each frame of the video. It is also understood that multiple color profiles could be provided if needed.

Figure 6:
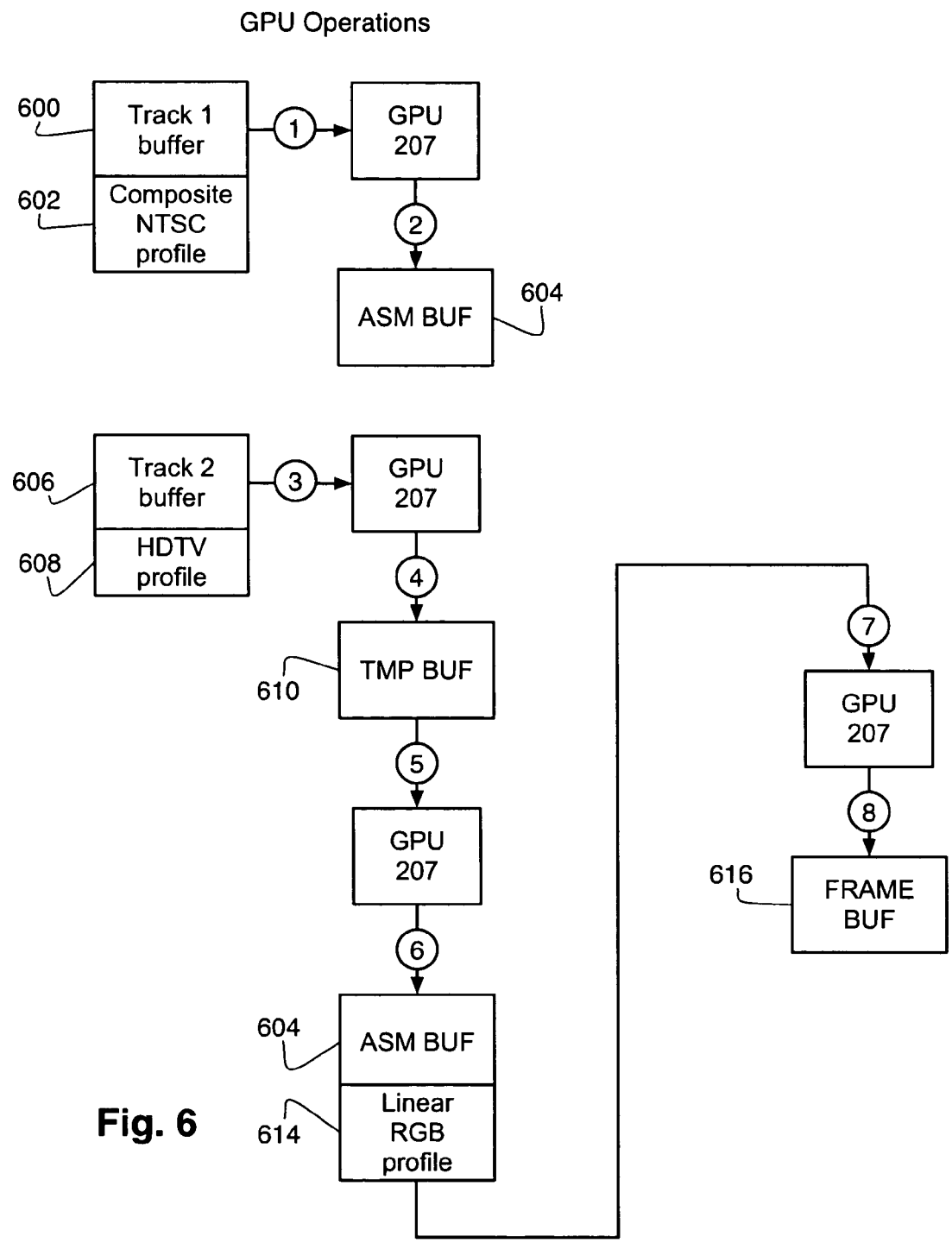
FIG. 6 shows operations and data of a graphics processing unit according to the present invention.

Referring then to FIG. 6, an illustration of the various data sources and operations of the GPU 207 are shown. A track 1 buffer 600 and the associated Composite NTSC profile 602 are provided to the GPU 207 in operation ①. Then in operation ② the GPU 207 converts the track 1 buffer using the Composite NTSC color profile from the indicated Composite NTSC color space to the desired color space and renders the track 1 buffer into the Linear RGB color space in the ASM buffer 604. The two step conversion process through the XYZ color space and any use of temporary buffers for that process are omitted in FIG. 6 for clarity. The track 2 buffer 606 and its attached HDTV color profile 608 are provided in operation ③ to the GPU 207. In operation ④ the GPU 207 converts the HDTV color space information from the track 2 buffer into an intermediate color space using its built-in hardware conversion equations for Y'CbCr to RGB color spaces and renders it into a temp buffer 610. In the illustrated embodiment a temp buffer 610 is utilized because the proper HDTV color space or profile utilized on the HDTV video source is slightly different than the Y'CbCr color profile conversion equations utilized in the hardware in the preferred GPU, which are SDTV or NTSC/PAL equations. Therefore, operation ④ provides an incorrect result and a correction from the actual color space utilized by the GPU 207 is required. Thus, in operation ⑤ the temp buffer 610 is provided to the GPU 207 and then operation ⑥ performs the correction and the final conversion and renders the temporary buffer contents, i.e., incorrect color space encoded track 2 values, into a proper Linear RGB color space into the ASM buffer 604. Of course, other corrections can be performed if desired. This ASM buffer 604 and its attached Linear RGB or related color profile are then provided again to the GPU 207 in operation ⑦, which then in operation ⑧ provides a final conversion to the proper color space of the LCD display device, for example, and provides this information to the frame buffer 616.

The various buffers can be located in either the DRAM 204 or in memory contained on the graphics controller 206, though the frame buffer is almost always contained on the graphics controller for performance reasons.

Thus an efficient method of performing real time color space conversion from video source to final display device has been described. Use of the GPU and its fragment programs provides sufficient computational power to perform the operations in real time, as opposed to the CPU, which cannot perform the calculations in real time. Therefore, because of the color conversions, the video is displayed with accurate colors.

Various changes in the components as well as in the details of the illustrated operational methods are possible without departing from the scope of the following claims. For instance, in the illustrative system of FIGS. 1, 2 and 3 there may be additional assembly buffers, temporary buffers, frame buffers and/or GPUs. In addition, acts in accordance with FIGS. 4, 5, and 6 may be performed by two or more cooperatively coupled GPUs and may, further, receive input from one or more system processing units (e.g., CPUs). It will further be understood that fragment programs may be organized into one or more modules and, as such, may be tangibly embodied as program code stored in any suitable storage device. Storage devices suitable for use in this manner include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. It is further understood that the video source can be any video source, be it live or stored, and in any video format.

The preceding description was presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

What is claimed is:

1. A method for displaying digital video, comprising:
   converting a buffer containing decoded video information in a source color space to a buffer in a working color space using a graphics processing unit to perform the conversion; and
   converting the buffer containing video information in the working color space to a buffer in a display color space using a graphics processing unit to perform the conversion,
   wherein said step of converting a buffer in the source color space includes:
      converting the buffer in the source color space to a temporary buffer in an intermediate color space using hardware conversion parameters contained in the graphics processing unit; and
      converting the temporary buffer in the intermediate color space to the buffer in the working color space using the graphics processing unit, and
   wherein the combined conversions provide a full conversion from the source color space to the working color space.

2. The method of claim 1, wherein the buffer containing the decoded video information in the source color space has an associated color profile of the video source device and wherein the buffer containing video information in the working color space has an associated color profile of the display device.

3. The method of claim 1, further comprising:
   converting a second buffer containing decoded video information in a second source color space to the buffer in the working color space using a graphics processing unit to perform the conversion.

4. The method of claim 1, further comprising:
   decoding video information into the buffer containing decoded video information in the source color space.

5. The method of claim 1, wherein the digital video is a series of frames and the source color space may change between two frames.

6. A computer readable medium or media having computer-executable instructions stored therein for performing the following method for displaying digital video, the method comprising:
   converting a buffer containing decoded video information in a source color space to a buffer in a working color space using a graphics processing unit to perform the conversion; and
   converting the buffer containing video information in the working color space to a buffer in a display color space using a graphics processing unit to perform the conversion,
   wherein said step of converting a buffer in the source color space includes:
      converting the buffer in the source color space to a temporary buffer in an intermediate color space using hardware conversion parameters contained in the graphics processing unit; and
      converting the temporary buffer in the intermediate color space to the buffer in the working color space using the graphics processing unit, and
   wherein the combined conversions provide a full conversion from the source color space to the working color space.

7. The computer readable medium or media of claim 6, wherein the buffer containing the decoded video information in the source color space has an associated color profile of the video source device and wherein the buffer containing video information in the working color space has an associated color profile of the display device.

8. The computer readable medium or media of claim 6, the method further comprising:
   converting a second buffer containing decoded video information in a second source color space to the buffer in the working color space using a graphics processing unit to perform the conversion.

9. The computer readable medium or media of claim 6, the method further comprising:
   decoding video information into the buffer containing decoded video information in the source color space.

10. The computer readable medium or media of claim 6, wherein the digital video is a series of frames and the source color space may change between two frames.

11. A computer system comprising:
- a central processing unit;
- memory, operatively coupled to the central processing unit, said memory adapted to provide a plurality of buffers, including a frame buffer;
- a display port operatively coupled to the frame buffer and adapted to couple to a display device;
- a graphics processing unit, operatively coupled to the memory; and
- one or more programs for causing the graphics processing unit to perform the following method, the method including:
  - converting a buffer containing decoded video information in a source color space to a buffer in a working color space using a graphics processing unit to perform the conversion; and
  - converting the buffer containing video information in the working color space to a buffer in a display color space using a graphics processing unit to perform the conversion,
- wherein said step of converting a buffer in the source color space includes:
  - converting the buffer in the source color space to a temporary buffer in an intermediate color space using hardware conversion parameters contained in the graphics processing unit; and
  - converting the temporary buffer in the intermediate color space to the buffer in the working color space using the graphics processing unit, and
- wherein the combined conversions provide a full conversion from the source color space to the working color space.

12. The computer system of claim 11, wherein the buffer containing the decoded video information in the source color space has an associated color profile of the video source device and wherein the buffer containing video information in the working color space has an associated color profile of the display device.

13. The computer system of claim 11, the method further comprising:
- converting a second buffer containing decoded video information in a second source color space to the buffer in the working color space using a graphics processing unit to perform the conversion.

14. The computer system of claim 11, the method further comprising:
- decoding video information into the buffer containing decoded video information in the source color space.

15. The computer system of claim 11, wherein the digital video is a series of frames and the source color space may change between two frames.

* * * * *